(12) United States Patent
Aquarius (10) Patent No.: US 8,074,863 B2
(45) Date of Patent: Dec. 13, 2011

(54) SEALING DEVICE FOR HEAT SEALING FOIL MATERIAL

(75) Inventor: Pieter Theodorus Joseph Aquarius, Stramproy (NL)

(73) Assignee: Ideepak Holding B.V., Stramproy (NL)

( * ) Notice: Subject to any disclaimer, the term of this patent is extended or adjusted under 35 U.S.C. 154(b) by 778 days.

(21) Appl. No.: 11/909,256

(22) PCT Filed: Mar. 24, 2006

(86) PCT No.: PCT/NL2006/000155
§ 371 (c)(1),
(2), (4) Date: Dec. 14, 2007

(87) PCT Pub. No.: WO2006/101391
PCT Pub. Date: Sep. 28, 2006

(65) Prior Publication Data
US 2010/0218903 A1    Sep. 2, 2010

(30) Foreign Application Priority Data
Mar. 24, 2005   (NL) .................................. 1028625

(51) Int. Cl.
*B23K 37/00* (2006.01)
*B30B 5/04* (2006.01)
(52) U.S. Cl. .................. 228/5.5; 228/6.1; 156/583.5
(58) Field of Classification Search .................. None
See application file for complete search history.

(56) References Cited

U.S. PATENT DOCUMENTS

| 3,480,505 | A |   | 11/1969 | Donnell, Jr. et al. |
| 3,484,325 | A |   | 12/1969 | Pendleton |
| 3,618,843 | A | * | 11/1971 | Hayes et al. .................. 228/3.1 |
| 3,729,359 | A |   | 4/1973 | Monsees |
| 4,041,207 | A | * | 8/1977 | Takada et al. ................. 428/421 |
| 4,216,638 | A | * | 8/1980 | Yoshida ........................ 156/466 |
| 4,455,079 | A | * | 6/1984 | Miwa et al. .................... 399/308 |
| 4,461,662 | A |   | 7/1984 | Onishi |
| 4,606,786 | A | * | 8/1986 | Andersson ................. 156/580.1 |
| 4,610,918 | A | * | 9/1986 | Effenberger et al. ........... 442/68 |
| 4,909,886 | A | * | 3/1990 | Noguchi ....................... 156/285 |

(Continued)

FOREIGN PATENT DOCUMENTS
EP          1 342 551 A1     9/2003
(Continued)

OTHER PUBLICATIONS
Machine translation of JP-2005-104689A (no date available).*
(Continued)

*Primary Examiner* — Kiley Stoner
(74) *Attorney, Agent, or Firm* — Leydig, Voit & Mayer, Ltd.

(57) ABSTRACT

The invention relates to a device for heat sealing two layers of foil material. To that end, the device comprises two blocks arranged opposite each other and conveying means for guiding the foil material between these blocks. Between the blocks, at least one heating element is provided, for heating the foil locally, and at least one circulating belt (20), which, in use, is guided along the blocks. The circulating belt (20) is built up from at least one layer of resilient material, so that a force applied by the blocks to the foil material is uniformly distributed over the sealing seam to be formed. The invention further relates to a circulating belt for use in a device according to the invention.

14 Claims, 5 Drawing Sheets

U.S. PATENT DOCUMENTS

| | | | |
|---|---|---|---|
| 4,992,133 A | | 2/1991 | Border |
| 5,378,304 A | * | 1/1995 | Denker .................. 156/555 |
| 5,421,450 A | * | 6/1995 | Kitagawa et al. ............. 198/847 |
| 5,603,801 A | * | 2/1997 | DeFriese et al. ............... 156/515 |
| 6,006,052 A | * | 12/1999 | Kamimura et al. ............. 399/69 |
| 6,605,178 B1 | * | 8/2003 | Shinohara et al. ......... 156/379.6 |
| 2002/0048472 A1 | * | 4/2002 | Samei ......................... 399/328 |
| 2003/0185606 A1 | * | 10/2003 | Takagi et al. ................. 399/329 |
| 2006/0289108 A1 | * | 12/2006 | McNamara et al. .......... 156/147 |
| 2007/0264058 A1 | * | 11/2007 | Mukai ........................... 399/307 |
| 2008/0066852 A1 | * | 3/2008 | Wetsch et al. ................. 156/147 |
| 2008/0085367 A1 | * | 4/2008 | Ikeda et al. ................... 427/296 |
| 2009/0014122 A1 | * | 1/2009 | Ishibuchi et al. ............. 156/325 |

FOREIGN PATENT DOCUMENTS

| | | | |
|---|---|---|---|
| GB | 2 251 404 A | | 7/1992 |
| JP | 2000-089593 A | * | 3/2000 |
| JP | 2005-104689 A | * | 4/2005 |
| NL | 1020273 C2 | | 9/2003 |
| WO | WO 01/85434 A2 | | 11/2001 |
| WO | WO 2006/003524 A2 | | 1/2006 |

OTHER PUBLICATIONS

International Search Report for PCT/NL2006/000155.

* cited by examiner

SEALING DEVICE FOR HEAT SEALING FOIL MATERIAL

FIELD OF THE INVENTION

The invention relates to a device for heat sealing foil material.

BACKGROUND

Such a device is known from WO 01/85434 of applicant. This known device can be used for instance for sealing bags manufactured from foil material tight, after these have been inflated with air or a different suitable filling medium. The thus obtained bags can be used as, for instance, filling material in packages, for the protection of products included in these packages. The known device comprises a sealing block provided with a sealing thread, and a counter block arranged opposite this sealing block, provided on a side facing the sealing block with a layer of resilient material. This ensures that a sealing force, applied by the counter block, is evenly distributed over the foil material to be sealed, so that an even sealing seam is obtained, of constant quality. Further, two Teflon circulating belts are provided, which are guided along the sealing surfaces facing each other of the sealing block and counter block, and between which, in use, the foil material is carried along. These circulating belts prevent direct contact between, on the one side, the foil material and, on the other side, the sealing block with the sealing thread and the counter block with the resilient layer, so that adhesion between the parts mentioned is prevented.

A drawback of this device is that between the resilient layer and the circulating belt guided therealong, considerable frictional forces can occur, which leads to wear. Furthermore, this may slow the circulating belt down, so that speed differences with respect to the other belt are formed. This leads to irregular pulling forces to the foil material, as a result of which this may begin to crease or deform otherwise, resulting in deformed sealing seams. Further, as a rule, resilient materials have a limited heat conduction coefficient or a great insulating action. With a device according to the invention, this causes heat given off by the sealing thread to be retained between the sealing block and the counter block, at least being insufficiently discharged, so that the sealing temperature rises and is difficult to control. This is unfavourable to the sealing quality.

SUMMARY OF THE INVENTION

The object of the invention is to provide a device of the type mentioned hereinabove, wherein at least a number of the drawbacks of the known device are obviated, while maintaining the advantages thereof. In particular, the invention contemplates providing a device wherein, during sealing, an even pressure can be applied to the foil material to be sealed. The invention further contemplates providing a device with which, during sealing, the sealing temperature can be controlled well.

These and further objects are at least partly achieved with a device according to the invention, characterized in that at least one of the circulating belts is provided with a layer of resilient material. This resilient layer can distribute a sealing force applied by the sealing blocks evenly over the foil material and hence take over the function of the above-mentioned resilient layer on the counter block. As, during use, the circulating belt is in motion, it can discharge at least a part of the heat produced during sealing from the sealing area and thus prevent or reduce accumulations of heat between the sealing blocks. As a result, the sealing temperature can be controlled better and, also owing to the uniform pressure distribution, a sealing seam of good and constant quality can be realized.

Preferably, the resilient layer of the circulating belt is manufactured from a material which at the prevailing sealing temperature does not adhere to the foil material and/or the sealing parts. As a result, a circulating belt according to the invention can also have the function of the conventional Teflon circulating belts. To that end, the resilient layer can be manufactured from, for instance, plastic, in particular silicones. Silicones have relatively good non-stick properties, are resilient and heat-resistant. In order to further enhance the resilience, these materials can, if desired, be foamed.

According to one embodiment of the invention, the circulating belt comprises several layers of material. For instance, the layer of resilient material can, on one side or on both sides, be covered with a layer of heat-resistant, friction reducing and/or non-stick material. More particularly, a side of the circulating belt facing the foil material in use may be provided with a heat-resistant, non-stick layer which can for instance comprise Teflon, and/or a side facing the sealing block in use may be covered with a frictional resistance reducing material. Thus, the freedom of choice as to appropriate materials for the resilient layer is increased, because this material needs only be resilient. Any further desired properties of the circulating belt can be achieved with the other layers. Thus, through a suitable combination of different layers of material, a circulating belt can be realized which can fulfill the different functions in an optimal manner.

According to one embodiment of the invention, the sealing device comprises one sealing block with heating element, one sealing block without heating element (hereinafter also called: counter block) and one resilient circulating belt. This is preferably arranged between the counter block and the foil material. Between the opposite sealing block and the foil material, a conventional Teflon circulating belt can be provided, to prevent adhesion. Owing to the resilient circulating belt, during sealing, an even, constant pressure can be applied to the foil material, also when this foil material comprises irregularities, such as creases or inclusions. Such irregularities can be followed through compression of the belt. Thus, over the entire sealing surface, a substantially even pressure can be applied, without stress peaks. As a result, a relatively small sealing force can suffice, so that the entire sealing device can be designed to be relatively light, small and portable. Furthermore, a small sealing force is favorable to the friction between the different parts and the lifespan thereof.

According to a further embodiment of the invention, the sealing device can comprise two resilient circulating belts, which, in that case, can extend on both sides of the foil material. As a result, the foil material is, as it were, clamped in a "floating" manner. The influence of any irregularities in the sealing underground (sealing block, counter block and/or heating element) is thereby eliminated and irregularities in the foil material (creases, variations in thickness, inhomogeneities) can be followed in the above-mentioned manner. In this case too, over the entire sealing seam a substantially constant, relatively small sealing pressure can be applied with all associated advantages mentioned hereinabove.

In the above embodiment, at least one of the circulating belts will border on a sealing block with a heating element. In order not to hinder the sealing action of this element, the respective circulating belt is preferably manufactured from a material with good heat conducting properties. The circulating belt bordering on a counter block (without heating element) can, conversely, be manufactured from a heat insulating material and can thus protect the counter block against high sealing temperatures.

The invention further relates to a circulating belt for use in a device according to the invention. Such a circulating belt can be advantageously used for converting known devices into a device according to the invention, by replacing at least one of the Teflon belts with a circulating belt according to the invention. In addition, the circulating belt can be used to replace worn circulating belts.

BRIEF DESCRIPTION OF THE DRAWING

In the further subclaims, further advantageous embodiments are described of a device and circulating belt according to the invention. In clarification, exemplary embodiments of a device according to the invention and parts thereof will be elucidated with reference to the drawing. In the drawing:

DETAILED DESCRIPTION OF THE DRAWINGS

Figure 1A:
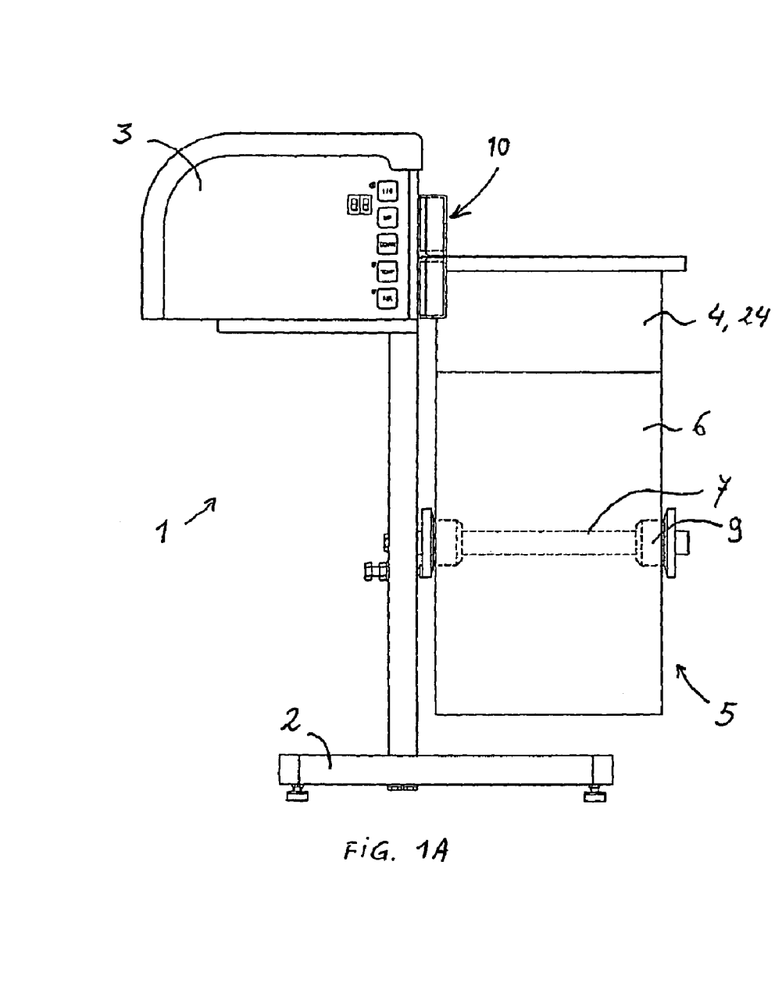
FIGS. 1A, B show, in side and front view, respectively, a first embodiment of a sealing device according to the invention.
Figure 1B:
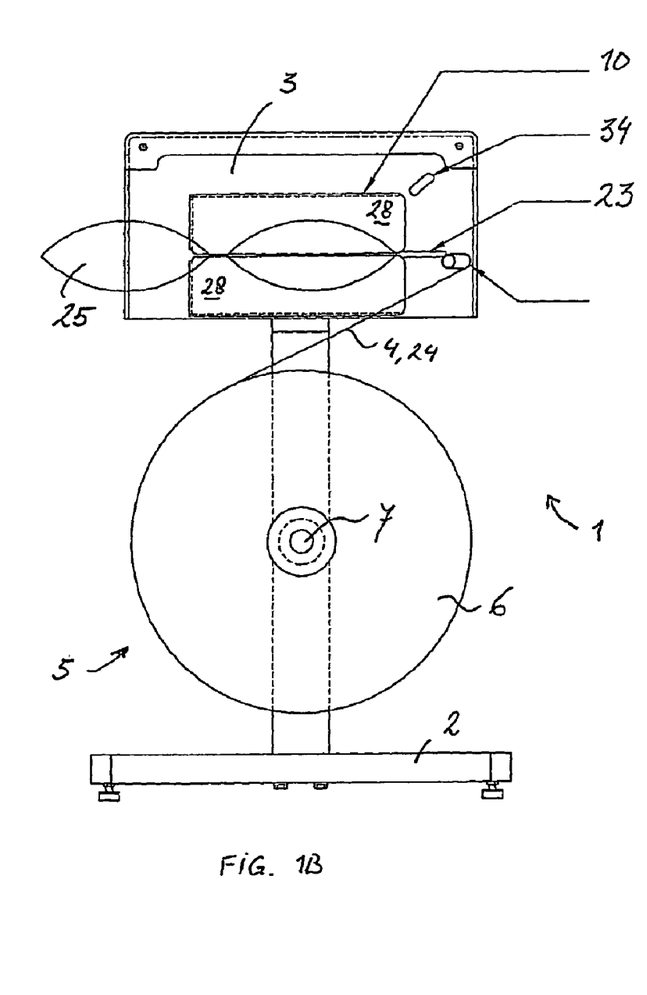
Figure 2A:
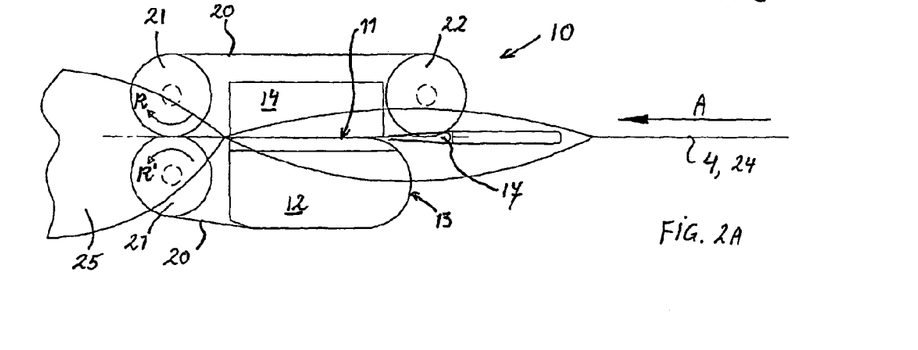
FIGS. 2A, B show, in further detail, a sealing unit of the device according to FIG. 1, in front and top plan view, respectively, FIGS. 3A, B show a roll of preconfigured foil material and a detail of the beginning of the roll.
Figure 2B:
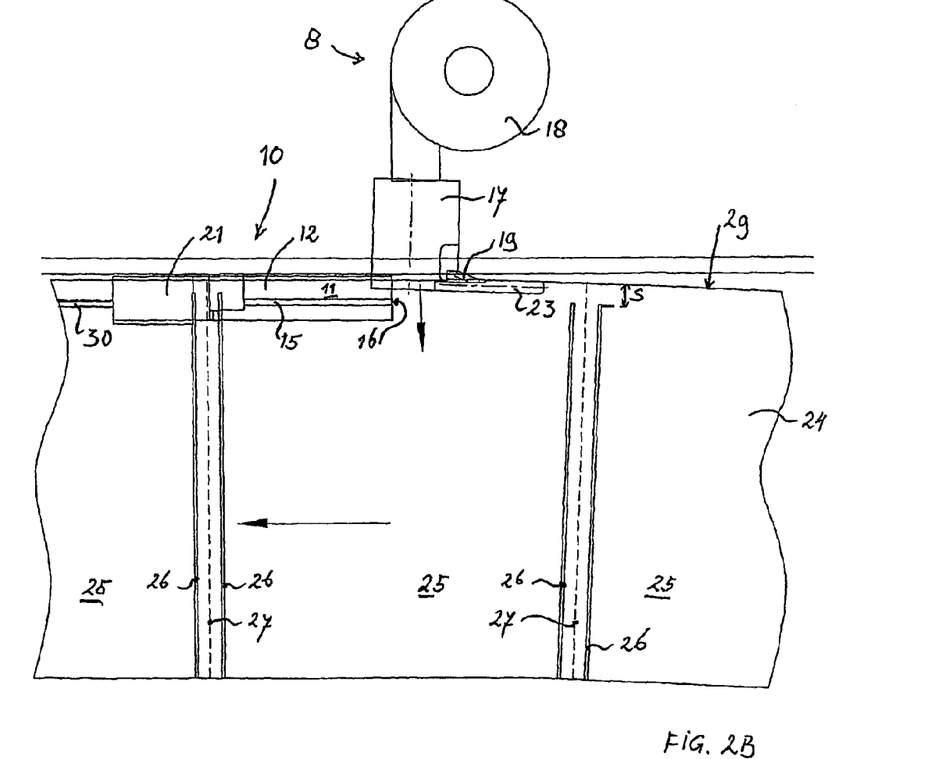

FIGS. 1A, B show a first exemplary embodiment of a device 1 according to the invention, suitable for sealing together foil material 4 such as, for instance, a foil tube 24 as shown in FIGS. 2A, B and 3A, B. This foil tube 24 is subdivided into chambers 25 by means of cross sealing seams 26. The cross sealing seams 26 do not extend over the entire width of the tube 24 but end at some distance S from a longitudinal edge 29 of the tube 24 (see FIG. 3B) for reasons to be clarified hereinafter. The chambers 25 can be inflated with a device 1 according to the invention, for instance with air, and then be sealed tight.

The device 1 shown in FIG. 1 comprises a support 2 and, mounted thereon, a preferably portable housing 3. The support 2 comprises a storing provision 5, for storing a stock of foil material 4. In the exemplary embodiment shown, the foil material 4 is supplied on a roll 6, as shown in FIG. 3. For that reason, the storing provision 5 is designed as a bearing-mounted axle 7 on which the roll 6 can be hung, optionally secured by clamping means 9. However, it will be clear that the foil material 4 can be supplied in a different manner, for instance stacked, in which case the storing provision 5 can have a shape adapted thereto. Housing 3 and support 2 are preferably of modular design, so that a housing 3 can simply be combined with different supports 2 (compare for instance FIGS. 1A, B and 5A-C) depending on, for instance, the intended use and/or the shape in which the foil material 4 to be sealed is supplied.

The housing 3 comprises an inflating unit 8, a sealing unit 10 and various drive and guide means not to be further described, for feeding the foil material 4 in a suitable manner along these units 8, 10. The sealing unit 10 comprises two blocks 12, 14 which, in FIG. 1B are hidden from view for the larger part by two covering plates 28, but which are clearly represented in FIG. 2A. These covering plates 28 serve for protection and can further help prevent the formation of creases in the foil material 4 and at least partly absorb inflating forces acting on the sealing seam to be formed, as described in the non-prepublished Dutch patent application NL 1026528 of applicant.

The blocks 12, 14 are moveably suspended in the housing 3 and, in the embodiment shown, can be moved apart by button 34 (see FIG. 1B). That is to say, the upper block 14 can be tilted upwards, in order to, for instance, facilitate insertion of a new roll of foil material or to liberate jammed foil material. In use, the blocks 12, 14 abut against each other with at least a part of their large side 11. Between these blocks 12, 14, at least one heating element is provided in the form of, for instance, a sealing thread, which, in the embodiment shown in FIG. 2A, is guided along at least a part of the circumference of the lower block 12, which, hence, functions as sealing block 12. In the case shown, the other block 14 functions as counter block and will be indicated as such in the following.

The sealing thread 15 extends along the large side 11 and a rounded, small side 13 in a groove 16 provided thereto in the sealing block 12. The sealing block 12 is manufactured from a heat-resistant and preferably heat-insulating material, for instance Teflon. The rounded side 13 is preferably covered, on both sides of the groove 16, with a wear-resistant material B, for instance aluminum, as described in the non-prepublished Dutch patent application NL 1026528 of applicant. This application is understood to be incorporated herein by reference, at least insofar as it relates to a sealing block provided with a wear-resistant covering. The large side 11 too can be covered on both sides of the groove 16 with such wear-resistant material B. As, however, this side 11 will usually experience less wear than the small side 13, such a covering layer B can also be omitted.

As stated, the second block 14 serves as counter block, with which during sealing a specific force can be applied to the foil material 4. This sealing force is preferably adjustable with biasing means not to be described further acting on one or each block 12, 14. In an alternative embodiment (an example of which is shown in FIG. 5C) the second block 14 can also comprise a heating element 15, and then, in a comparable manner, be designed as the first sealing block 12, the wear-resistant covering included. Such an embodiment offers the advantage that the foil material 4 is heated on both sides, so that sealing can take place faster and/or thicker layers of foil material can be processed.

Figure 6:
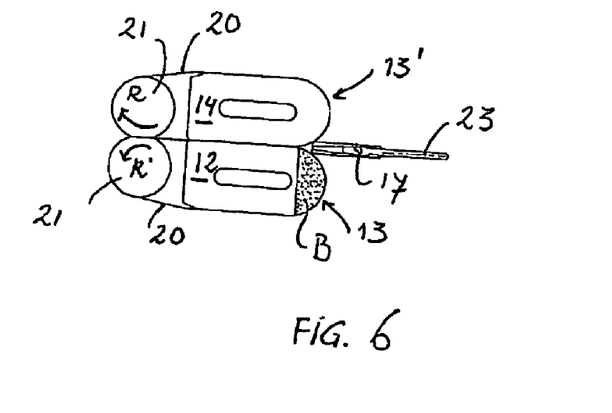
FIG. 6 shows an alternative embodiment of a sealing unit according to the invention.

In the exemplary embodiment according to FIG. 2A, around each of the blocks 12, 14, an endless circulating belt 20 closed upon itself is provided. The upper circulating belt 20 is guided around two rollers 21, 22 arranged on both sides of the counter block 14, one of these rollers functioning as driven roller 21. The lower circulating belt 20 is guided around a similar driven roller 21 and around the rounded side 13 of the sealing block 12 itself. The above-mentioned wear-resistant covering then preserves the sealing block 12 against excessive wear. Naturally, the lower circulating belt 20 can be guided in a comparable manner as the upper circulating belt 20 around two separate guiding rollers 21, 22 (not shown) so that wear to the sealing block 12 can be reduced to a minimum and the sealing block 12 can be designed without rounded side 13 and wear-resistant covering B. Alternatively, the counter block 14 can be provided, like the sealing block 12, with a rounded side 13', as shown in FIG. 6, in which case the guiding roller 22 can be omitted. In the embodiment according to FIG. 6, only the lower block 12 is provided with a sealing thread 15 and therefore manufactured from a heat-resistant, heat and electricity insulating material, with wear-resistant covering B. The upper block 14 can be manufactured completely from wear-resistant material, for instance aluminum that, if desired, may have undergone a hardening treatment. The block 14 can for instance be hard anodized, so that it obtains a hard, wear-resistant' layer with a relatively smooth surface. A similar operation can be carried out to the wear-resistant covering B of the sealing block 12.

Both driven rollers 21 are driven, by drive and/or transmission means not further shown, at the same rate but in opposite directions (as indicated by arrows R, R') so that both circulating belts 20, at the location of the blocks 12, 14, have the same through-feed rate A. The circulating belts 20 can therefore function as conveying means for foil material 4 clamped therebetween. The circulating belts 20 are manufactured from heat-resistant material and preferably manufactured from, or at least covered with a non-stick material so that the belts 20, the foil material 4, the heating element 15 and/or the blocks 12, 14 are prevented from sticking to each other. Further, at least one of the circulating belts 20 comprises a layer of resilient material, for instance a layer of silicones which may or may not be foamed.

In the exemplary embodiment according to FIGS. 1, 2A, B and 6, preferably, at least the circulating belt 20 extending around the counter block 14 is provided with such a layer of resilient material. As a rule, such resilient material has a relatively limited heat conduction coefficient, in particular when this material has an airy foamed structure. As a result, circulating belts 20 manufactured from such a material are less suitable for use around a sealing block, 12 with a heating element 15, as they can impede the heat transfer between the heating element 15 and the foil material 4 and can thus slow down and/or reduce the sealing action. Conversely, the resilient material is suitable for use around the counter block 14, since its heat insulating properties can protect the counter block 14 from overheating. As, furthermore, the circulating belt 20 revolves, a part of the sealing heat can be discharged directly to the environment. As a result, accumulation of heat between the blocks 12, 14 is prevented or, in any case, decelerated so that the sealing temperature in situ can be controlled better.

The lower circulating belt 20, around the sealing block 12, can for instance be designed as a conventional circulating belt of Teflon, as known from, for instance, the earlier-mentioned non-prepublished Dutch patent application NL 1026528, which application is understood to be incorporated herein by reference, at least insofar as it relates to a circulating belt. Alternatively, this circulating belt 20 too can be formed, at least partly, from resilient material. In order to guarantee a good heat transfer between the heating element 15 and the foil material 4, the selected resilient material can have a relatively high heat conduction coefficient, or the resilient layer can be intersected locally by heat-conducting bridges or the like.

In the exemplary embodiment (see FIG. 2B) shown, the inflating unit 8 comprises a pump 18 and a blow pipe 17 connected thereto, with which compressed air (or a different suitable medium, in particular gas) can be blown into the chambers 25 of the foil tube 24. The inflating unit 8 further comprises, adjacent an outflow opening of the blow-in pipe 17, a somewhat rod-shaped guiding element 23, with a rounded free end, and a knife 19.

The device 1 can further comprise a control unit and one or more sensors (not shown), for measuring and controlling specific process parameters such as the feed-through rate of the circulating belts 20 and/or the foil material 4, the sealing temperature, sealing force et cetera. Preferably, at least one temperature sensor is provided (not shown), which can for instance be provided in one or both blocks 12, 14, preferably the sealing block 12 provided with a heating element 15. With it, a sealing temperature applied to the foil material can be measured, either directly or indirectly, for instance by measuring the direct ambient temperature and/or the set power of the heating element 15, optionally in combination with the time duration during which the heating element is switched on.

Figure 3A:
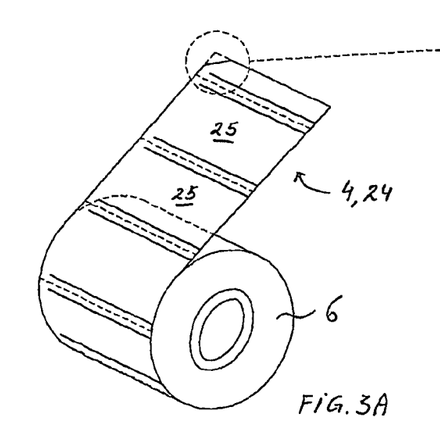
Figure 3B:
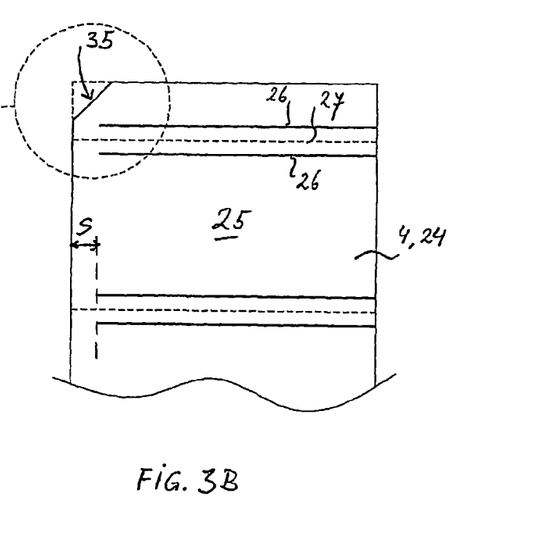

The device 1 as described hereinabove works as follows. The foil material 4 is guided, from the roll 6, via the guiding means to the inflating unit 8 and, at that location, is slid over the guiding element 23, while the guiding element 23 can reach through the passage S, formed between the cross sealing seams 26 and along the longitudinal edge 29. To facilitate introduction of the guiding element 23, the beginning of the roll of foil material 4 on the side of the longitudinal edge 29 can be provided with a bevelled corner as shown in FIG. 3B. At the passing of the knife 19, the longitudinal edge 29 is cut opened whereupon the thus opened chambers 25 are inflated with air via the blow pipe 17. Then, the longitudinal edge 29 is sealed tight by the sealing unit 10, while the sealing seam 30 formed intersects with the cross sealing seams 26. If desired, between the chambers 25, weakening lines 27 can be provided such as for instance a perforation line along which the chambers 25 can be separated. Thus, a series of cushions 25 can be realized which can serve as, for instance, protective material around vulnerable products, and/or as filling material in packages.

Sealing the chambers 25 tight proceeds as follows. The cut-open foil edges 29 are fed, clamped between the circulating belts 20, along the blocks 12, 14 (in the direction of arrow A, FIG. 2A) at the circulating rate of the respective belts 20. The foil layers 24 are then heated locally by the heating element 15 and simultaneously pressed together by the blocks 12, 14 so that the foil layers 24 fuse together locally. The at least one resilient circulating belt 20 then ensures that a sealing force applied by the blocks 12, 14 is evenly distributed over the sealing surface, also when this surface contains irregularities, for instance in that the foil material 4, during supply, becomes somewhat creased or comprises variations in thickness as a result of inhomogeneities, inclusions, production inaccuracies or the like. Such irregularities are generally smoothened through increase of the sealing force but this leads to high stress peaks and requires large, heavy parts. With a sealing unit 20 according to the invention, the resilient circulating belt 20 will follow the irregularities by being compressed locally. As a result, the circulating belt 20 can abut well over the entire sealing length against the foil material 4 and apply an even, constant pressure thereto, without the sealing force, to that end, needing to be increased or appreciable stress peaks occurring. Such a constant pressure contributes to the realization of a constant, even sealing seam 30. The smoothening action of the resilient material furthermore ensures that the heating element 15 and the blocks 12, 14 are protected from stress peaks which helps lengthen the life span of these parts. As no high sealing forces are required, the device 1 can furthermore be designed to be relatively light and portable so that the device 1 can be used in a mobile manner and the foil material can be inflated at any desired location.

Figure 4:
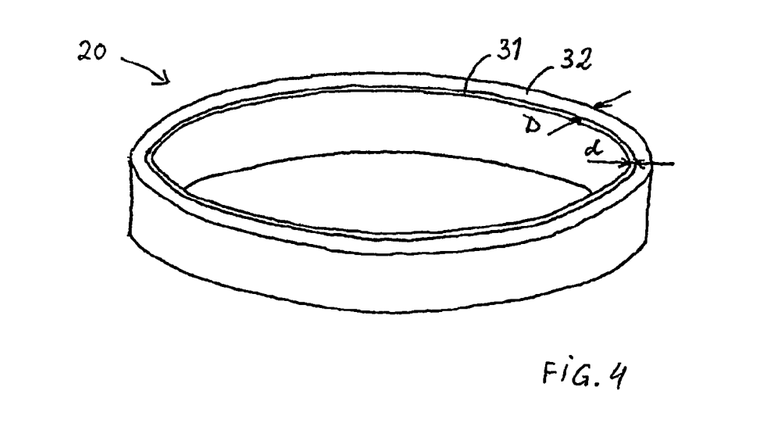
FIG. 4 shows an embodiment of a circulating belt according to the invention.

FIG. 4 shows a possible embodiment of a circulating belt 20 in further detail. In the example shown, this circulating belt 20 is designed as a belt 20 closed upon itself, built up from two layers, i.e. a carrier 31 with a relatively limited thickness d, and a resilient layer 32 with a relatively great thickness D, in order to offer a sufficiently great path of compression.

The carrier 31 is located on a side facing inwards in FIG. 4 (and, in use, facing the blocks 12, 14 and rollers 21, 22) and is preferably so strong and heat resistant that during use, this carrier 31 can absorb forces acting on the circulating belt 20 at the prevailing temperatures. In addition, the carrier 31 is preferably relatively smooth or provided with a layer of frictional resistance reducing material, in order to minimize friction between the carrier 31 and the blocks 12, 14 and/or rollers 21, 22 and wear associated therewith. The carrier 31 can for instance be manufactured from nylon. Nylon is strong, heat resistant and has good non-stick properties. If desired, the nylon carrier 31 can be provided on an inside with a Teflon coating, in order to reduce (even further) the frictional resistance. Alternatively, the carrier 31 may be manufactured from a glass fiber, and then be coated or impregnated with Teflon. Such a glass fiber Teflon carrier can for instance be manufactured in a manner as described in the above mentioned patent application NL 1026528 of applicant, which application is understood to be incorporated herein by reference, at least insofar as it relates to the embodiment and manner of production of Teflon circulating belts.

The resilient layer 32 may be manufactured from plastic, for instance silicones. Preferably, this plastic is foamed, in order to enhance the path of compression and resilience. If desired, the side facing outwards in FIG. 4 of the resilient layer 32 (i.e. the side which, in use, faces the foil material 4) can be provided with a thin layer of non-stick material, for instance Teflon, in order to prevent adhesion between the circulating belt 20 and the foil material 4.

Preferably, the circulating belts 20 are manufactured by weaving a seamless tube of Nylon or glass fiber and cover this tube with a layer of silicones and possible further coating layers, whereupon the tube can be cut to belts of a desired width. Alternatively, the different band layers 31, 32 can be designed as separate belts. For instance, a resilient circulating belt 20 according to the invention (made of resilient material) can be combined with a known glass fiber Teflon circulating belt (as described in NL 1026528) which, for the protection of the resilient circulating belt 20, can be provided between this belt 20 and the foil material 4, preferably around the same (driven) rollers 21, 22.

In this manner, through a suitable combination of layers of material, a circulating belt 20 can be realized with various properties which are advantageous to the different functions of the belt. For instance, through a suitable choice of the layers facing outwards, the wear resistance of the circulating belt 20 can be enhanced or the resilient layer 32 can be embedded between layers of heat insulating material so that the resilient layer 32 itself can be manufactured from a material with a lesser heat resistance. Naturally, the circulating belts 20 can be built up from more layers than the two layers shown in FIG. 4.

Figure 5A:
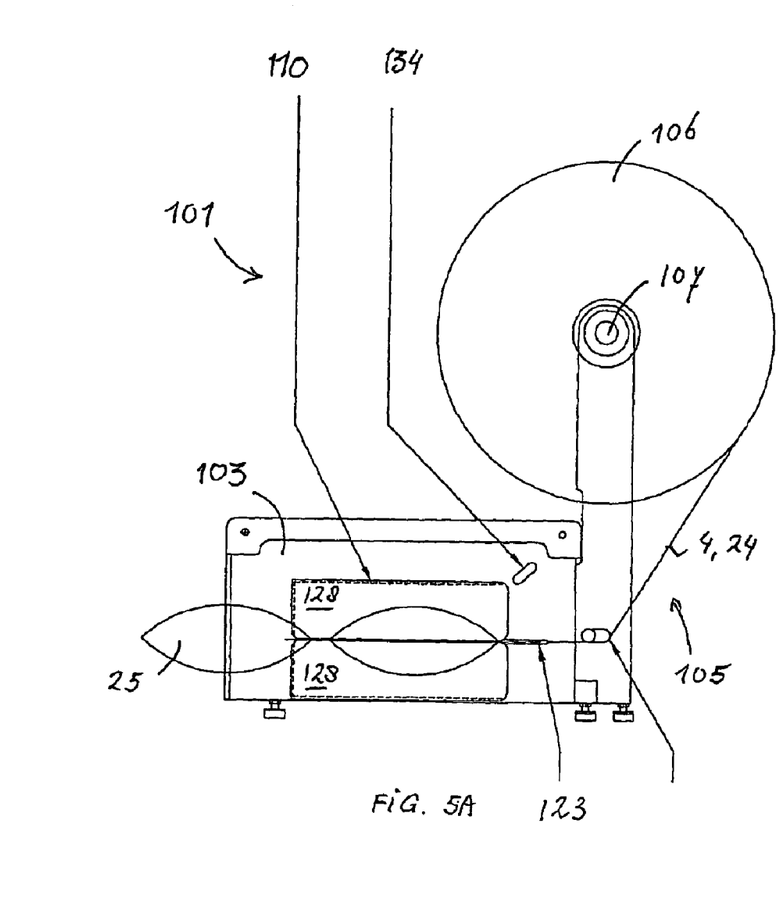
FIGS. 5A-C show an alternative embodiment of a sealing device according to the invention.
Figure 5B:
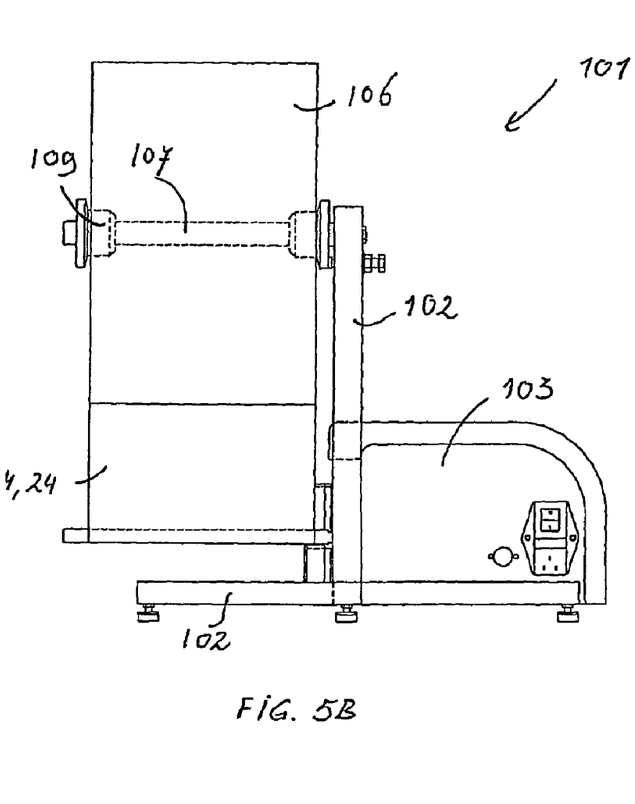
Figure 5C:
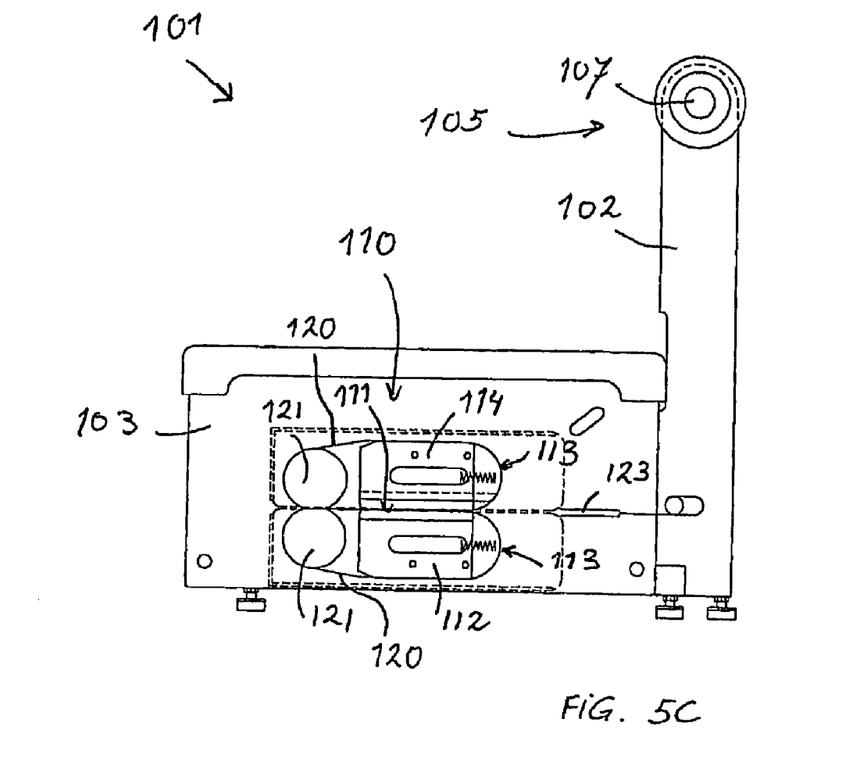

FIGS. 5A-C schematically show a further exemplary embodiment of a sealing device 101 according to the invention. Identical or corresponding parts are indicated with identical or corresponding reference numerals, increased by 100. In this exemplary embodiment, the device 1 is designed as a table-top model having a housing 103 comparable to FIGS. 1A, B but an modified support 102, with a storing provision 105 for the foil material 4 which projects above the housing 103. The blocks 112, 114 of the sealing unit 110 are both designed as sealing block (see FIG. 5C), with a heating element 115 (not visible) which is guided along a large side 111 and a rounded side 113 of the respective blocks 112, 114 in a groove provided thereto (not visible), and around a driven roller 121, in a manner comparable to that as described for sealing block 12 in FIGS. 2A, B. In the embodiment according to FIGS. 5A-C, one of the circulating belts 120 can be a standard Teflon circulating belt (as described in NL 1026528) and the other circulating belt 120 can be designed with at least one resilient layer according to the invention. Alternatively, both circulating belts 120 can be provided with such a resilient layer. In both cases, this resilient layer is preferably manufactured from a material with good heat conducting properties, so that the action of the heating elements 115 is not disturbed, at least the heat given off by these elements is transferred to the foil material 4.

The invention is not limited in any manner to the exemplary embodiments represented in the description and the drawing. All combinations of (parts of) embodiments described and/or shown are understood to fall within the inventive concept. Moreover, many variations thereon are possible within the framework of the invention, as set forth in the following claims.

The invention claimed is:

1. A device for heat sealing two layers of foil material, comprising:
    two blocks suspended opposite each other; and
    a conveyor for guiding the foil material between the two blocks;
    at least one heating element provided between the two blocks; and
    at least one circulating belt, which is advanced along the two blocks, the at least one circulating belt comprising multiple layers of material, a first layer and a second layer of the multiple layers having different material properties, the first layer being made of a compressible resilient material, and a thickness of the first layer being greater than a thickness of the second layer, wherein the resilient material of the first layer of the at least one circulating belt is a foamed material.

2. The device according to claim 1, wherein the first layer of the at least one circulating belt is manufactured at least partly from a plastic.

3. The device according to claim 1, wherein the resilient material is provided on at least one side with a layer of heat resistant material having non-stick properties.

4. The device according to claim 1, wherein the resilient material is provided on at least one side with a layer of frictional resistance reducing material.

5. The device according to claim 1, wherein, in use, the heating element and the circulating belt extend on both sides of the foil material.

6. The device according to claim 1, wherein two circulating belts are provided which, in use, extend on both sides of the foil material.

7. The device according to claim 2, wherein the at least one circulating belt includes a first circulating belt located adjacent a heating element and has a higher heat conduction coefficient than a second circulating belt located adjacent a block, of the two blocks, without a heating element.

8. The device according to claim 1, wherein the at least one circulating belt forms part of the conveying means for moving the foil material along the two blocks, and wherein a traveling rate of the at least one circulating belt is substantially equal to that of the foil material to be sealed.

9. The device according to claim 1, wherein the at least one circulating belt is an endless belt closed upon itself, and wherein the at least one circulating belt is guided between the two blocks with the aid of at least one driven roller.

10. The device according to claim 2, wherein the plastic is a silicone.

11. The device according to claim 3, wherein the heat resistant material having non-stick properties is polytetrafluoroethylene.

12. The device according to claim 4, wherein the frictional resistance reducing material is polytetrafluoroethylene.

13. The device according to claim 10 wherein the silicone is a foamed silicone.

14. The device according to claim 1 wherein the second layer facing at least one of the two blocks is a layer of frictional resistance reducing material, wherein a further layer, in use facing the foil, is a heat-resistant non-stick layer.

* * * * *